(12) United States Patent
Lechner et al.

(10) Patent No.: US 11,433,854 B2
(45) Date of Patent: Sep. 6, 2022

(54) ACCESS CONTROL METHOD FOR PERSONS AND VEHICLES AND SYSTEM FOR CARRYING OUT THE METHOD

(71) Applicant: SKIDATA AG, Grödig/Salzburg (AT)

(72) Inventors: Walter Lechner, Grödig/Salzburg (AT); Martin Haslinger, Grödig/Salzburg (AT); Reinhard Surkau, Grödig/Salzburg (AT); Martin Haidacher, Grödig/Salzburg (AT)

(73) Assignee: SKIDATA AG, Grödig/Salzburg (AT)

( * ) Notice: Subject to any disclaimer, the term of this patent is extended or adjusted under 35 U.S.C. 154(b) by 0 days.

(21) Appl. No.: 17/147,012

(22) Filed: Jan. 12, 2021

(65) Prior Publication Data

US 2021/0221331 A1 Jul. 22, 2021

(30) Foreign Application Priority Data

Jan. 20, 2020 (EP) ..................................... 20152693

(51) Int. Cl.
*B60R 25/24* (2013.01)
*H04B 17/318* (2015.01)
*B60R 25/33* (2013.01)

(52) U.S. Cl.
CPC ............ *B60R 25/245* (2013.01); *B60R 25/33* (2013.01); *H04B 17/318* (2015.01); *B60R 2325/101* (2013.01)

(58) Field of Classification Search
None
See application file for complete search history.

(56) References Cited

U.S. PATENT DOCUMENTS

| | | | |
|---|---|---|---|
| 9,715,773 | B2 | 7/2017 | Clemente et al. |
| 2017/0046889 | A1* | 2/2017 | Clemente ................. G07C 9/10 |
| 2018/0146336 | A1 | 5/2018 | Hoyer et al. |
| 2018/0189688 | A1 | 7/2018 | Haidacher et al. |
| 2020/0045537 | A1* | 2/2020 | Colombo ........... G07C 9/00571 |
| 2020/0269809 | A1* | 8/2020 | Sanji ....................... B60R 25/31 |

FOREIGN PATENT DOCUMENTS

| | | |
|---|---|---|
| EP | 2 991 041 A2 | 3/2016 |
| EP | 3 131 065 A1 | 2/2017 |
| EP | 3 343 474 A1 | 7/2018 |
| KR | 2017 0020173 A | 2/2017 |
| WO | 2019/069257 A1 | 4/2019 |

\* cited by examiner

*Primary Examiner* — Carlos Garcia
(74) *Attorney, Agent, or Firm* — Finch & Maloney PLLC; Jay S. Franklin; Michael J. Bujold

(57) ABSTRACT

An access control method in an access control system that comprises at least one access control device with an antenna (2, 3, 4). Verification of an access authorization is based on analysis of a beacon transmitted by a first wireless communication standard. The beacon contains an ID to which a unique identifier (TID) of the data carrier and a unique beacon ID of the data carrier (1) transmitting the beacon is assigned. The unique identifier and unique beacon ID allows positive beacon identification. The identification and localization of the data carriers (1) is realized by analyzing the RSSIs of the transmitted beacons. The unique beacon IDs ensure that the RSSI values of the same respective beacon of a data carrier (1) are used in the course of the RSSI analysis. The closest data carrier (1) is determined, during the RSSI analysis, and the transmitted ID is analyzed to grant access.

15 Claims, 2 Drawing Sheets

ACCESS CONTROL METHOD FOR PERSONS AND VEHICLES AND SYSTEM FOR CARRYING OUT THE METHOD

This application claims priority from European patent application serial no. 20152693.6 filed Jan. 20, 2020.

FIELD OF THE INVENTION

The present invention relates to an access control method for persons and vehicles. The invention furthermore relates to a system for carrying out the inventive method.

BACKGROUND OF THE INVENTION

Access control methods and systems for persons or vehicles are known from the prior art. In this context, an access control is typically realized by reading out access authorizations in a contactless manner, wherein access control devices are provided and comprise means for detecting and analyzing access authorizations, as well as mechanical or other locking elements that are automatically or manually transferred from a locking position into a release position upon presentation of a valid access authorization. Other known access control devices are realized without locking elements.

According to the prior art, different contactless communication standards such as WLAN, BLE (Bluetooth Low Energy), RFID or NFC may be used for reading out access authorizations in a contactless manner, wherein the access control devices comprise for this purpose at least one reading device or antenna unit, which receive signals of a data carrier that contain an access authorization or an ID, to which an access authorization is assigned.

A few of these standards such as NFC or the contactless readout of access authorizations by means of barcode scanners have a very short range such that merely a "touch and go" functionality—but no advantageous "hands-free" functionality—is provided.

In standards that have a greater range and therefore provide the desired "hands-free" functionality, it is necessary to adjust the range of the reading devices or antennas in such a way that data carriers are only detected within a certain distance in the correct direction in order to avoid separation and collision problems with data carriers of queued persons or vehicles. In the case of multilane access, it is furthermore necessary to realize a reliable lane or access separation.

It should also be taken into consideration that data carriers in the form of mobile telephones behave differently with respect to the emission of signals in dependence on the antenna arrangement and the power or configuration of the installed hardware.

SUMMARY OF THE INVENTION

The present invention is based on the objective of disclosing a simplified access control method in an access control system for persons or vehicles that comprises at least one access control device, wherein the verification of an access authorization is in this method realized based on the analysis of an ID, which is transmitted from a data carrier to an access control device by means of a wireless communication standard and to which at least one access authorization is explicitly assigned.

The inventive method particularly should allow "hands-free" access control, wherein separation and collision problems with data carriers of queued persons or vehicles are avoided and a reliable lane or access separation is ensured in the case of multilane access. The data carrier located closest to an access control device in the direction of access particularly should be determined in order to subsequently analyze the ID, which is transmitted by this data carrier and to which at least one access authorization is explicitly assigned, and to grant access if the access authorization is valid.

The invention furthermore aims to disclose a system for carrying out the inventive method.

This objective is attained by the method with the characteristics features of the present invention. Other inventive embodiments and advantages can be gathered from the dependent claims. A system for carrying out the inventive method of the present invention is also disclosed.

Accordingly, the invention proposes an access control method in an access control system for persons or vehicles that comprises at least one access control device, wherein each access control device respectively has at least one antenna, wherein the verification of an access authorization is realized based on the analysis of at least one beacon, which is transmitted in an advertising mode in regular intervals from a data carrier to an access control device by means of a first wireless communication standard, and wherein said beacon contains an ID, to which at least one access authorization is explicitly assigned, and a unique identifier of the data carrier.

According to the invention, each of the beacons transmitted by the data carriers additionally contains a unique beacon ID for the respective data carrier transmitting the beacon, wherein the combination of the unique identifier of the data carrier and the unique beacon ID for the data carrier allows a positive identification of each beacon transmitted by each data carrier. According to a variation of the invention, the beacon ID is unique for the respective data carrier transmitting the beacon and for a predefined time interval, e.g. for a predefined number of minutes or hours from the beginning of the transmission process, such that the combination of the unique identifier of the data carrier and the beacon ID allows a positive identification of each beacon transmitted by each data carrier within the predefined time interval. Depending on the respective access control system, the predefined time interval may according to an enhancement correspond, for example, to the average time required for the access control in an access control system for vehicles or in the case of a ski area to the maximum length of stay in the ski area plus a respectively applicable offset.

The identification and localization of the data carriers is realized by analyzing the RSSIs (Received Signal Strength Indicators) of the beacons transmitted by the data carriers at the at least one antenna of the access control device, wherein the data carrier located closest to the access control device in the direction of access is thereby determined and the ID, which is transmitted by this data carrier and to which at least one access authorization is explicitly assigned, is analyzed in order to grant access if the access authorization is valid. The positive identification of each beacon transmitted by each data carrier, which is made possible due to the combination of the unique identifier of the data carrier and the unique beacon ID for the data carrier, ensures that the RSSI values of the same respective beacon of a data carrier are used in the course of the RSSI analysis.

The data carriers transmit the beacons in regular intervals that amount, for example, to 120 ms+/−20%.

The respective access control devices preferably are connected to a server, wherein the RSSI analysis and/or the analysis of the validity of an access authorization may be carried out in the server. Alternatively, the RSSI analysis and/or the analysis of the validity of an access authorization may take place in the respective access control devices.

The data carriers preferably are realized in the form of mobile telephones or smartwatches, wherein it is advantageous to use the IMEI number as the unique identifier of the data carrier in this case; the data carriers may furthermore be realized in the form of separate transmitters.

According to an embodiment of the invention, the transmission process of the beacons can be activated by a user by means of an app installed on the data carrier, wherein the user can select the correct or valid ID for the respective access control system, to which an access authorization is assigned.

According to an enhancement of the invention, correction values that may differ for each data carrier type, e.g. for each mobile telephone model, are used in the RSSI analysis in order to compensate the different transmitting powers of the first wireless communication standard transmission modules of different data carrier types. This measure is intended to prevent a data carrier with a very high transmitting power from being detected as the data carrier located closest to an access control device in the direction of access although another data carrier with lower transmitting power is actually located closer to the access control device. However, such a situation should only arise very rarely because the antennas preferably are arranged directly in front of the respective access point in the direction of access and cover this area such that the correct data carrier is detected as the data carrier located closest to an access control device in the direction of access based on the decrease of the radiated power per surface unit essentially with the square of the distance in usual transmitting power differences, for example, in usual transmitting power differences of mobile telephones.

In this case, the correction value related to the data carrier type can be transmitted to the access control device with the beacons of a data carrier via the antennas of the access control device, wherein this correction value is taken into consideration in the analysis of the signal on the receiver side. This preferably is controlled by an app installed on the data carriers.

Alternatively, a lookup table containing the correction values for different data carrier types may be stored on the receiver side, namely in the access control device or in a server connected to the respective access control device, wherein a corresponding correction value is selected and used for the RSSI analysis based on the positive identification of the data carrier.

For example, the first wireless communication standard may be a BLE standard, a UWB (Ultra Wideband Technology) standard or a WLAN standard.

If an additional flow of information from the access control device to the data carriers required, e.g. if the user should be informed of an occurred access, the invention proposes that, in case the first standard is a BLE standard, this additional flow of information takes place in accordance with another wireless communication standard such that the data carrier does not have to be switched over from a transmitting mode to a receiving mode for the BLE standard. For example, the other standard may be a WLAN or LTE standard.

According to an enhancement of the invention, it is proposed to activate and to interrupt the transmission process of the beacons in accordance with the geo-fencing principle in order to optimize the energy demand of the data carriers and to allow a long battery life of the data carriers used. For example, the transmitting function of the data carriers can be activated in an advertising mode when they are located in proximity to an access control device within a predefined range based on the analysis of a GNSS (Global Navigation Satellite System) signal of a GNSS receiver, for example a GPS receiver of the data carriers.

Alternatively, the transmitting function of the data carriers may be activated in an advertising mode when they are located within the range of an activation signal according to a second wireless communication standard emitted by an access control device and receive this activation signal, wherein the transmitting function is deactivated when the data carrier is located outside the range of the activation signal.

The second wireless communication standard may correspond to the first wireless communication standard, wherein the first standard may be, for example, a BLE standard, a UWB standard or a WLAN standard. In this context, the invention proposes that, if an additional flow of information from the access control device to the data carrier is required, this additional flow of information takes place in accordance with another wireless communication standard such that the data carrier does not have to be switched over from a transmitting mode to a receiving mode for the BLE standard after the reception of the activation signal.

The activation of the transmitting function of the data carriers in an advertising mode preferably is controlled by an app installed on the data carrier.

The geo-fencing principle keeps the power consumption of the data carriers as low as possible because the transmitting function is activated when it is needed, namely when a data carrier is located in proximity to an access control device, such that it can be assumed that the person carrying along the data carrier would like to enter the area covered by the access control system.

The signal strength of the activation signal emitted by an access control device is chosen in such a way that the transmitting function of potential data carriers is with consideration of their reception properties activated in a predefined offset interval referred to the access control device. According to the invention, the emission angle of the signal emitted by an access control device may also be defined in such a way that the range is also limited with respect to the angle, wherein this is particularly advantageous, for example, in the case of multilane access.

According to the invention, the activation signal contains information that positively identifies the access control device emitting the activation signal, e.g. an ID of the access control device and optionally an ID of the access control system, wherein the data carrier transmits a beacon in an advertising mode in regular intervals, e.g. of 120 ms+/−20%, after the reception of the activation signal, and wherein said beacon contains the received data for identifying the access control device emitting the activation signal, an ID, to which at least one access authorization is explicitly assigned, a unique identifier of the data carrier and a unique beacon ID for the data carrier.

The information contained in the activation signal, which positively identifies the access control device emitting the activation signal or, in the case of the activation of the transmission process of the beacon, the geolocation determined based on GNNS (Global Navigation Satellite System) signals can be used by an app installed on the data carrier for automatically selecting an ID, to which a correct or valid access authorization for the respective access control device or the respective access control system is assigned, from a list of potential IDs and to transmit this ID by means of the beacon. No beacons preferably are emitted if no ID exists, to which a correct or valid access authorization for the respective access control device or the respective access control system is assigned.

The functionalities of the apps mentioned in the course of the description preferably are contained in one app.

The combination of the unique identifier of the data carrier and the unique beacon ID for the data carrier allows a positive identification of each beacon transmitted by each data carrier. According to an enhancement, the time sequence of the values of the beacon IDs of the beacons transmitted by a data carrier can be determined in accordance with a predefined pattern or in accordance with a predefined function.

The inventive transmission of unique beacons prevents cloning of the beacons and therefore misuse. Furthermore, the identification of the data carriers is thereby optimized and simplified.

According to an embodiment of the invention, the beacon IDs may be generated by means of an algorithm, wherein the algorithm is also stored in the receiving access control device or in the access control system and used for analyzing the beacon IDs such that it becomes even more difficult to clone the beacons; furthermore, the beacon ID may be a time stamp containing the current date.

The at least one access control device, to which one access point is respectively assigned, has at least one antenna in order to receive the beacons transmitted by the data carriers, wherein the proximity of a data carrier to the at least one antenna, i.e. the identification and localization of the data carrier by means of an analysis of the RSSIs (Received Signal Strength Indicators) of the beacons of the data carriers in a predefined time interval, is determined at the at least one antenna based on the unique identifier of the data carrier and the beacon ID. This is made possible due to the positive identification of each beacon transmitted by each data carrier as a result of the analysis of the combination of the unique identifier of the data carrier and the unique beacon ID for the data carrier.

Beacons from different data carriers can be distinguished from one another due to the unique identifier of the data carriers, wherein the beacon ID is used if multiple antennas are provided in order to allow a comparison between the signal strengths of a beacon of a data carrier at the different antennas.

According to an embodiment of the invention, it is proposed that, during the analysis of the received signal strengths of the beacons of the data carriers, it is checked if two different beacons of a data carrier have at an access control device with a single antenna a higher signal strength than a predefined threshold value within a predefined time interval, which may amount, for example, to one second, wherein the data carrier is detected as the data carrier located closest to the access control device in the direction of access if this is the case.

In an access control device with multiple antennas, it is according to an embodiment checked if at least two different beacons of a data carrier respectively have at least at two antennas a higher signal strength than a predefined threshold value within a predefined time interval, which may amount, for example, to one second, wherein the data carrier is detected as the data carrier located closest to the access control device in the direction of access if this is the case. Alternatively, it is checked if at least two different beacons of a data carrier respectively have at least at two antennas a higher signal strength than a predefined first threshold value within a predefined time interval or if at least two different beacons of a data carrier have at one of the antennas a higher signal strength than a predefined second threshold value within a predefined time interval, wherein the second threshold value is higher than the first threshold value.

The access control devices may have one antenna if the data carriers assume a defined position directly in front of the access point, e.g. if the data carriers are arranged on vehicles at a predefined location, wherein the antenna should in this case be arranged as close as possible to the data carriers and directly in front of the access point in the direction of access.

If the position of the data carriers varies as it is the case with persons who have different body sizes and may carry the mobile telephone, for example, in a trouser or breast pocket or in a briefcase, it is advantageous to cover the area directly in front of the access point in the direction of access with as many antennas as possible.

The antennas are arranged in such a way that the data carrier located closest to an access control device in the direction of access is determined by means of the RSSI analysis. It is preferred to laterally arrange the antennas directly in front of the access point in the direction of access.

According to another embodiment of the invention, the analysis of the received signal strengths of the beacons of the data carriers may be carried out at the at least one antenna based on the RSSI gradient of the beacons of the data carriers by means of a neural network in order to determine the data carrier located closest to an access control device in the direction of access.

In this case, the neural network is trained by means of multiple signal curves that are based on test data. For this purpose, signal curves of many valid passages are recorded with a defined variability of transmission modules and carrying positions, wherein the recorded signal curves are used for training, for example, an RNN (Recurrent Neural Network) in combination with a LSTM (Long Short Term Memory). The trained model is subsequently used for analyzing future signal curves.

During the analysis of the signal strengths of the received beacons, the beacon ID is also used for detecting if the data carrier transmitting the beacons is an "active" and "valid" device. If this is the case, successive beacons of a data carrier differ with respect to the beacon ID. If successive beacons of a data carrier do not differ with respect to the beacon ID, it is assumed that an unauthorized person taps a single signal of the transmission and reproduces this signal in a loop.

If the time sequence of the values of the beacon IDs of the beacons transmitted by a data carrier is stored in the receiving access control device or in the access control system, it can according to an enhancement be checked if the beacon IDs of two successive beacons of a data carrier correspond to the known time sequence of the values of the beacon IDs. Misuse of the system is detected if this is not the case.

BRIEF DESCRIPTION OF THE DRAWINGS

An example of the invention is described in greater detail below with reference to the attached figures. In these figures.

DETAILED DESCRIPTION OF THE PREFERRED EMBODIMENTS

Figure 1:
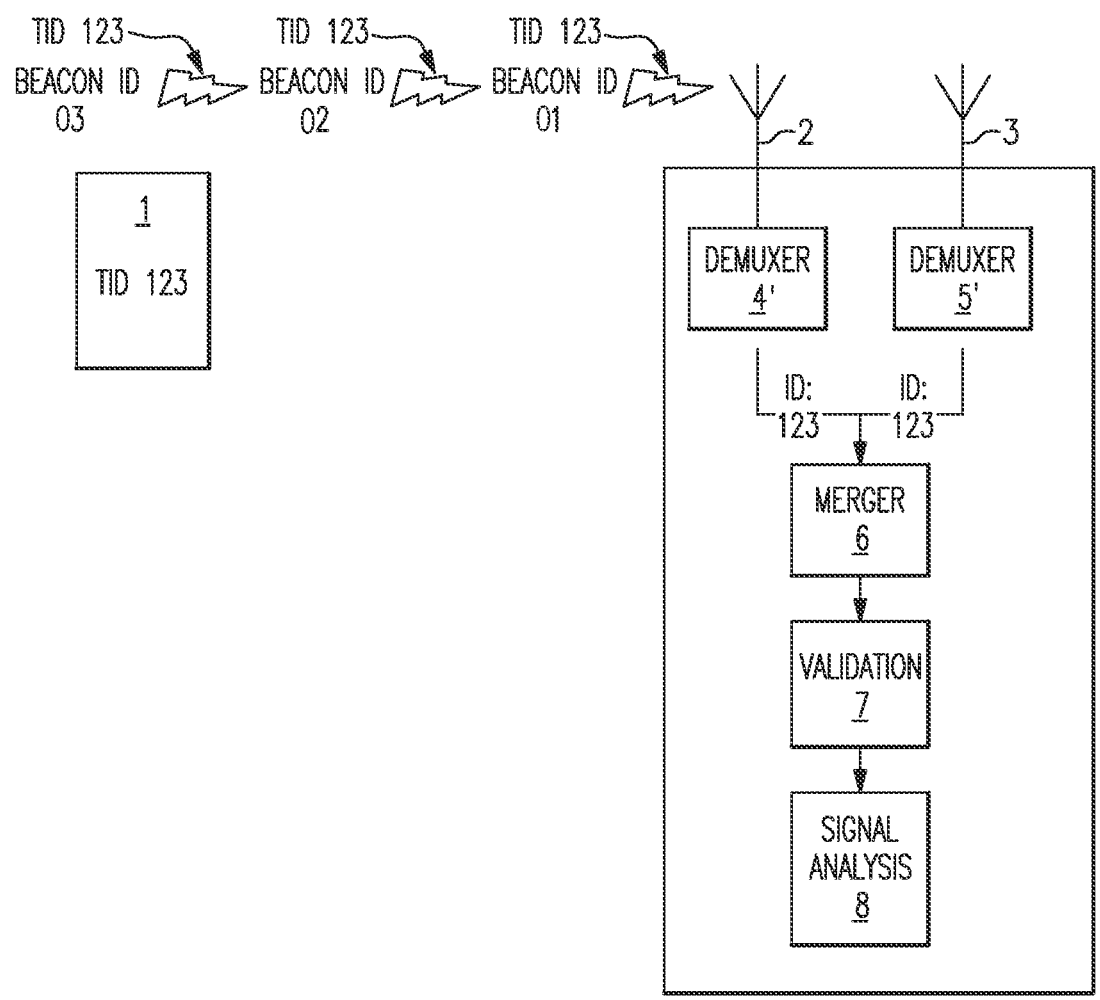
FIG. 1 shows a schematic representation of a data carrier and an access control device with two antennas in order to elucidate an embodiment of the inventive method.

In FIG. 1, the reference symbol 1 identifies a data carrier that is realized in the form of a transmitter and transmits beacons, which contain a unique identifier TID of the data carrier 1 and a respective unique beacon ID for this data carrier 1. In the figure, exemplary beacons are illustrated with the beacon IDs 01, 02 and 03.

The beacons are received by the two antennas 2, 3 of an access control device, wherein beacons of different data carriers can be distinguished from one another, e.g. in the beacon demuxers (demultiplexers) 4', 5', based on the unique identifier of the data carriers. If multiple antennas are provided as in the example shown, the beacon ID is used for comparing the signal strength of the same beacon at the different antennas, wherein this may be realized, for example, by means of a beacon merger 6 in connection with a validation unit 7 and an RSSI analysis unit 8. The components 4', 5', 6, 7, 8 required for analyzing the beacon may form a signal analysis unit and be provided in the access control devices or in a unit that is connected to a server.

Figure 2:
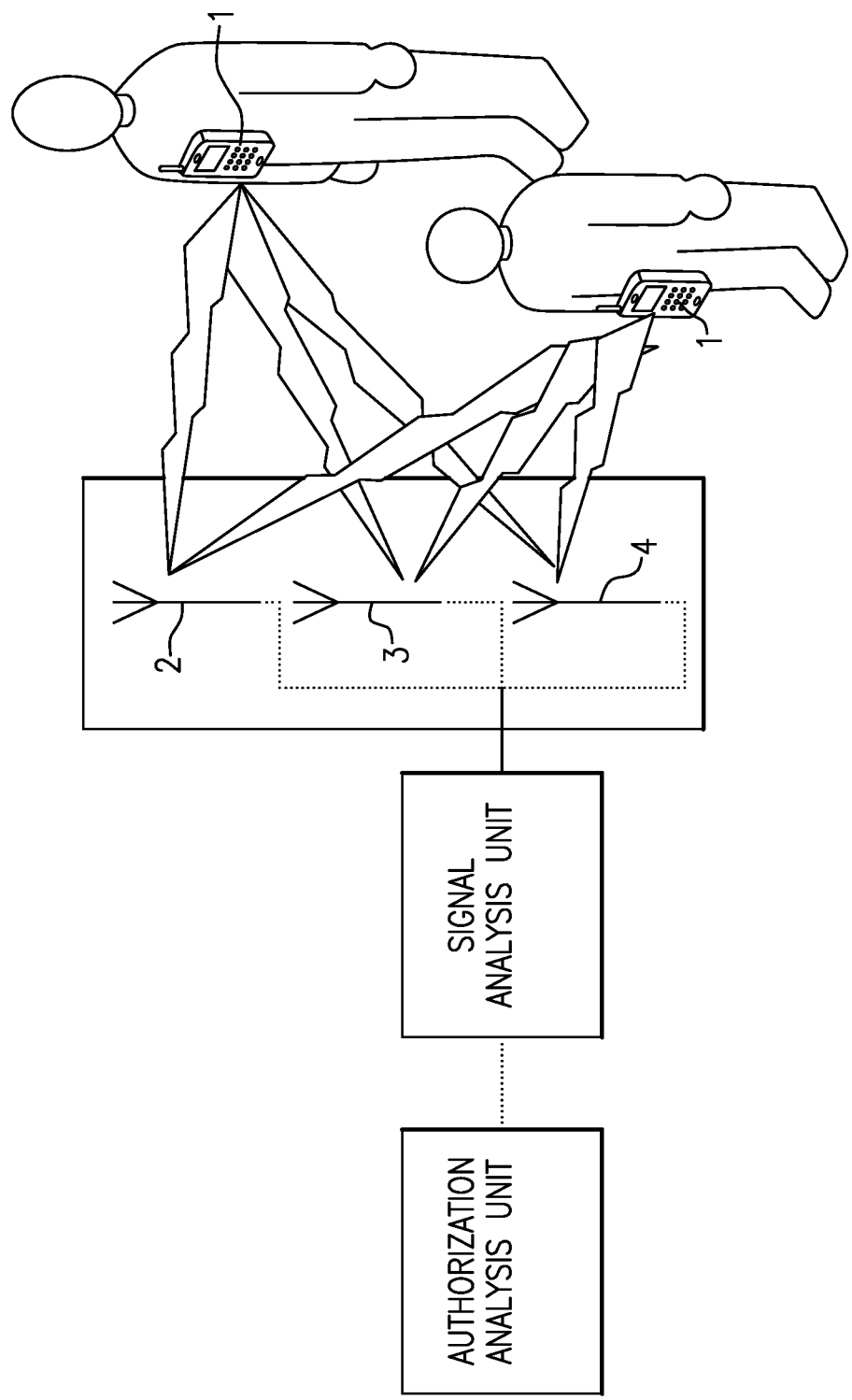
FIG. 2 shows a potential arrangement of the antennas of an access control device for persons.

FIG. 2 schematically shows an example of an antenna arrangement for an access control device for persons. Three antennas, 2, 3, 4 are provided in the example shown, wherein said antennas are arranged on one side of the access lane of the access point and directly in front of the access point in the direction of access such that they cover the entire area directly in front of the access point. This arrangement is particularly advantageous if a variable position of the data carriers 1, which are realized in the form of mobile telephones in the example shown, is expected as it is the case with persons. According to another embodiment, antennas may also be provided on the opposite side, wherein the total number of antennas, as well as the height and width of the antenna arrays, may vary. The received signals are transmitted to a signal analysis unit 9, wherein the data of the beacon of the data carrier determined to be located closest to the access control device in the direction of access, particularly the ID, which is contained in the beacon of this data carrier and to which an access authorization is assigned, is after the analysis transmitted to an access authorization analysis unit 10 that may be installed, for example, on a server, and wherein access is granted, e.g. by controlling a locking element of the access control device, if the access authorization is valid. An optical and/or acoustical signal can be output if no locking elements are provided and no valid access authorization exists.

An inventive access control system, particularly a system for carrying out the inventive method, therefore preferably comprises at least one access control device, to which an access point is respectively assigned, wherein said access control device is connected to a server, on which an access authorization analysis unit is installed, and has at least one antenna that is arranged on one side of the access lane of the access point, as well as directly in front of the access point in the direction of access, and covers the entire region directly in front of the access point, with said system also comprising data carriers that are suitable for transmitting beacons according to a first wireless communication standard, e.g. according to the BLE standard, which can be received by the at least one antenna and contain an ID, to which at least one access authorization is explicitly assigned, a unique identifier of the data carrier and a respective unique beacon ID for the respective data carrier transmitting the beacon, wherein said beacon ID allows a positive identification of each beacon transmitted by each data carrier in combination with the unique identifier of the data carrier.

After the reception, the beacons are transmitted to a signal analysis unit provided in the access control device or in the server, wherein an RSSI analysis is carried out in said signal analysis unit in order to determine the data carrier located closest to an access control device in the direction of access, wherein the data of the beacon of the data carrier determined to be located closest to the access control device in the direction of access is after the RSSI analysis transmitted to the access authorization analysis unit for validity analysis, and wherein access is granted if the validity analysis shows that the access authorization is valid.

The invention claimed is:

1. An access control method in an access control system for at least one of persons or vehicles that comprises:
    at least one access control device,
    the at least one access control device respectively has at least one antenna being configured to communicate with a plurality of data carriers,
    verification of an access authorization is realized based on analysis of at least one beacon, which is transmitted in an advertising mode in regular intervals from a respective one of the plurality of data carriers to the at least one access control device by a first wireless communication standard, and
    said at least one beacon contains an ID, to which at least one access authorization is explicitly assigned, and a unique identifier (TID) of the respective data carrier,
    wherein the at least one beacon additionally contains a unique beacon ID for the respective data carrier transmitting the at least one beacon,
    a combination of the unique identifier of the respective data carrier and the unique beacon ID for the respective data carrier allows a positive identification of each of the at least one beacon transmitted by each of the plurality of data carriers,
    identification and localization of respective ones of the plurality of data carriers is realized by analyzing Received Signal Strength Indicators (RSSIs) of the beacons transmitted by one or more of the plurality of data carriers at the at least one antenna of the at least one access control device, and
    positive identification of each of the at least one beacon transmitted by each of the plurality of data carriers is ensured by the combination of the unique identifier of the respective data carrier and the unique beacon ID for the respective data carrier, and Received Signal Strength Indicators (RSSI) values of the same respective beacon of the respective data carrier are used in the course of Received Signal Strength Indicators (RSSI) analysis, the respective data carrier located closest to the access control device, in a direction of access, is determined by the RSSI analysis and the unique beacon ID, which is transmitted by the respective data carrier and to which the at least one access authorization is explicitly assigned, is analyzed in order to grant access if the access authorization is valid.

2. The access control method in the access control system for at least one of persons or vehicles according to claim 1, wherein the plurality of data carriers are realized in the form of a mobile telephone or a smartwatch, and an IMEI number is used as the unique identifier of the respective data carrier.

3. The access control method in the access control system for at least one of persons or vehicles according to claim 1, wherein the unique beacon ID is generated by an algorithm, which is also stored in a receiving one of at least one access control device or in the access control system and used for analyzing the beacon IDs.

4. The access control method in the access control system for at least one of persons or vehicles according to claim 1, wherein, during the analysis of the received signal strength indicators of the at least one beacon of the respective data carrier,
it is checked if at least two different beacons of the respective data carrier have, at an access control device with a sole antenna, a higher signal strength than a predefined threshold value within a predefined time interval, the respective data carrier is detected as being the data carrier located closest to the access control device with the sole antenna in the direction of access if this is the case, or
in an access control device with multiple antennas, it is checked
if at least two different beacons of the respective data carrier respectively have, at least at two antennas, a higher signal strength than a predefined first threshold value within a first predefined time interval or
if at least two different beacons of the respective data carrier have at one of the multiple antennas a higher signal strength than a predefined second threshold value within a second predefined time interval, the predefined second threshold value is higher than the predefined first threshold value, and the respective data carrier is detected as being the data carrier located closest to the access control device with the multiple antennas in the direction of access if this is the case.

5. The access control method in the access control system for at least one of persons or vehicles according to claim 1, wherein the analysis of the received signal strengths of the beacons of the respective data carriers is carried out at the at least one antenna based on a Received Signal Strength Indicators (RSSI) gradient of the beacons of the respective data carriers by a neural network in order to determine a data carrier located closest to the at least one access control device in the direction of access, the neural network is trained by multiple signal curves that are based on test data, signal curves of many valid passages are recorded with a defined variability of transmission modules of the respective data carriers and carrying positions, and the recorded signal curves are used for training a Recurrent Neural Network (RNN) in combination with a Long Short Term Memory (LSTM).

6. The access control method in the access control system for at least one of persons or vehicles according to claim 1, wherein the unique beacon ID is also used for detecting if the respective data carrier transmitting the beacons is an active and valid device, this is the case if successive beacons of the respective data carrier differ with respect to the unique beacon ID, and it is assumed that an unauthorized person taps a single signal of the transmission and reproduces this signal in a loop if successive beacons of a data carrier do not differ with respect to the beacon ID.

7. The access control method in the access control system for at least one of persons or vehicles according to claim 1, wherein a transmitting function of the respective of the plurality of data carriers is activated in the advertising mode when one or more of the data carriers are located within a predefined range, based on an analysis of a GNSS signal of a GNSS receiver of the respective data carriers or located within a range of an activation signal according to a second wireless communication standard emitted by the at least one access control device and receive this activation signal, the transmitting function is deactivated when the respective data carrier is located outside the predefined range based on the analysis of the GNNS signal or when the respective data carrier is located outside the range of the activation signal, the activation signal contains information that positively identifies the at least one access control device emitting the activation signal, and the at least one beacon transmitted by the respective data carriers additionally contain this information.

8. The access control method in the access control system for at least one of persons or vehicles according to claim 7, wherein the activation of the transmitting function of the data carriers in the advertising mode is controlled by an app installed on the respective data carrier.

9. The access control method in the access control system at least one of for persons or vehicles according to claim 7, wherein the first wireless communication standard corresponds to the second wireless communication standard.

10. The access control method in the access control system for at least one of persons or vehicles according to claim 1, wherein the first wireless communication standard is one of a BLE standard, a UWB standard or a WLAN standard.

11. The access control method in the access control system for at least one of persons or vehicles according to claim 10, wherein, if an additional flow of information from the access control device to the plurality of data carriers is required, the additional flow of information takes place in accordance with another wireless communication standard such that the respective data carrier does not have to be switched over from a transmitting mode to a receiving mode for the BLE standard, the UWB standard or the WLAN standard after reception of the activation signal.

12. The access control method in the access control system for at least one of persons or vehicles according to claim 1, wherein correction values, which may differ for each data carrier type, are used in the RSSI analysis in order to compensate for different transmitting powers of the first wireless communication standard transmission modules of different data carrier types.

13. The access control method in the access control system for at least one of persons or vehicles according to claim 12, wherein the correction value related to the data carrier type is transmitted to the access control device with the beacons of the respective data carrier, and this correction value is taken into consideration in the RSSI analysis.

14. The access control method in the access control system for at least one of persons or vehicles according to claim 12, wherein a lookup table containing the correction values for the different data carrier types is stored in the at least one access control device or in a server, and a corresponding correction value is selected and used for the RSSI analysis based on the positive identification of the data carriers transmitted by the beacons.

15. A system for carrying out the method according to claim 1, comprising the at least one access control device, to which an access point is respectively assigned, wherein the at least one access control device is connected to a server, on which an access authorization analysis unit is installed, and has the at least one antenna that is arranged on one side of an access lane of the access point, as well as directly in front of the access point in the direction of access, and covers an entire region directly in front of the access point, the system also comprising the plurality of data carriers that are suitable for transmitting the at least one beacon according to the first wireless communication standard, which can be received by the at least one antenna and contain the ID, to which the at least one access authorization is explicitly assigned, the unique identifier of the respective data carrier and a respective unique beacon ID for the respective data carrier transmitting the beacon, wherein said unique beacon ID allows a positive identification of each of the at least one beacon transmitted by each of the plurality of data carriers in combination with the unique identifier of the respective data carrier, wherein the at least one beacon can after the reception be transmitted to a signal analysis unit provided in the at least one access control device or in the server, wherein an RSSI analysis can be carried out in said signal analysis unit in order to determine the respective data carrier located closest to the at least one access control device in the direction of access, wherein data of the at least one beacon of the respective data carrier determined to be located closest to the at least one access control device in the direction of access can after the RSSI analysis be transmitted to the access authorization analysis unit for validity analysis, and wherein access is granted if the validity analysis shows that the access authorization is valid.

\* \* \* \* \*